(12) United States Patent
Fischer

(10) Patent No.: US 6,847,030 B1
(45) Date of Patent: Jan. 25, 2005

(54) SCANNING DEVICE FOR A POSITION-MEASURING SYSTEM FOR SCANNING A SCALE GRADUATION

(75) Inventor: Peter Fischer, Bernau (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 22 days.

(21) Appl. No.: 09/711,547

(22) Filed: Nov. 13, 2000

(30) Foreign Application Priority Data

Nov. 19, 1999 (DE) .......................................... 199 57 822

(51) Int. Cl.[7] .............................................. G01D 5/34
(52) U.S. Cl. .................................... 250/231.1; 250/238
(58) Field of Search ....................... 250/231.13, 231.14, 250/231.15, 231.16, 231.17, 231.18, 554, 231.1; 361/23, 24, 93.1, 93.8; 341/11, 13

(56) References Cited

U.S. PATENT DOCUMENTS

| | | | | |
|---|---|---|---|---|
| 4,103,155 A | * | 7/1978 | Clark | 250/231.13 |
| 4,369,578 A | * | 1/1983 | Ernst | 33/1 PT |
| 4,470,873 A | * | 9/1984 | Nakamura | 216/22 |
| 4,620,094 A | * | 10/1986 | Tani et al. | 250/231.16 |
| 4,700,065 A | * | 10/1987 | Kordulla et al. | 250/231.14 |
| 4,831,484 A | * | 5/1989 | Bruch | 361/101 |

FOREIGN PATENT DOCUMENTS

JP          11-27320        *   8/1999   .......... H01H/37/76

OTHER PUBLICATIONS

BEI Motion Systems Company's "Optical Encoder Design Guide", Sep. 1990.*

* cited by examiner

Primary Examiner—Edward J. Glick
Assistant Examiner—Chih-Cheng Glen Kao
(74) Attorney, Agent, or Firm—Sidley Austin Brown & Wood, LLP

(57) ABSTRACT

The invention relates to a scanning device for a position measuring system for scanning a scale graduation with a probe, which can be brought into operative connection with the scale graduation and is supplied with electric power over electrical connections; an electronic module, which is coupled over electric connections to the probe; a housing for the electronic module for thermally shielding the electronic module from the surroundings; and means for limiting the supply of current to the probe. Pursuant to the invention, the electrical connections, leading to the probe, within the housing of the electronic module, have at least one fuse, which interrupts the flow of current to the probe when the temperature produced as a result of the current flow exceeds a specifiable value. The housing the electronic module forms the housing of the fuse.

5 Claims, 2 Drawing Sheets

SCANNING DEVICE FOR A POSITION-MEASURING SYSTEM FOR SCANNING A SCALE GRADUATION

FIELD OF INVENTION

The invention relates to a scanning device for a position-measuring system for scanning a scale graduation comprising a probe connected with the scale graduation and supplied with electric power over electrical connections; an electronic module being electrically coupled to the probe; a housing for shielding the electronic module from the surroundings; and means for limiting the supply of current to the probe when the temperature produced as a result of the current flow exceeds a specific value.

BACKGROUND OF THE INVENTION

The scanning device, in accordance with the invention, comprises a probe that may be brought into operative connection with the scale graduation for ascertaining the positional information contained in the scale graduation; an electronic module being coupled electrically with the probe and evaluating the signals generated by the probe in scanning the scale graduation, and a housing for shielding the module from the surroundings.

Because of the encapsulation of the electronic module in the housing and the extensive shielding of the electronic module from the surroundings, a device with such an electronic module can further be used in a potentially explosive environment, since any heating of the electronics, or a voltage spark within the electronics that can arise due to equipment defects, remains limited to the electronic module itself. In particular, impermissible heating of the outer surface of the housing is avoided.

In a probe that is used for the direct scanning of the scale graduation, however, a comparable shielding is usually not possible, since the probe is to be brought into operative connection with the scale graduation. Accordingly, the probe cannot be completely shielded from the surroundings and the probe is, thus, usually surrounded only by a simple protective coating. Therefore, in potentially explosive surroundings, additional devices are provided for limiting the current supplied to the probe to prevent the probe from being heated by the increased uptake of current to a temperature due to equipment defects, which cannot be tolerated in a potentially explosive environment. In particular, external Z diodes or external amperage limiting devices are used for limiting the voltage or the current.

SUMMARY OF THE INVENTION

It is an object of the invention to create a simple and cost-effective scanning device that is useable in a potentially explosive environment.

Pursuant to the invention, the above objective is accomplished by providing a scanning device for a position measuring system for scanning a scale graduation comprising a probe connected with the scale graduation and supplied with electric power over a plurality of electrical connections; an electronic module being electrically coupled to the probe; a housing for shielding the electronic module from the surroundings; and means for limiting the supply of current to the probe, wherein at least one fuse is provided in the electrical connections, leading to the probe, within the housing, for interrupting the flow of current to the probe when the temperature produced as a result of the current flow exceeds a specific value, and wherein the housing of the electronic module further forms the housing for the fuse.

In accordance with the invention, the electrical connections leading to the probe of the scanning device have at least one fuse within the housing of the electronic module. This fuse interrupts the flow of current to the probe, when the temperature, produced in the fuse as a result of the current flowing, exceeds a specified value, the housing of the electronic module at the same time forming the housing of the fuse to shield the module from the environment.

The invention is based on the realization that, because of the shielding of the electronic module from the environment by a housing, the heating of the electrical components within the housing does not result in the danger of an explosion and that therefore fuses, which do not have their own housing, can be used within the housing to interrupt the current. The housing of the electronic module therefore assumes the double function, on the one hand, of shielding the electronic module from the (potentially explosive) surroundings and, on the other, of serving as (the only) housing for at least one fuse, with which the current, supplied to the probe of the scanning device, is interrupted when excessively high.

The inventive solution makes a very simple and cost-effective interruption of the current to the probe of the scanning device possible, in that a melting section, which melts when the amperage in this section exceeds a certain maximum value, is provided in the electrical connections supplying the probe. This melting section can be formed, for example, by a section of the electrical connection having a smaller cross section. The region of reduced cross section has the largest current density or the greatest ohmic resistance within the electrical connections. If the current increases suddenly, for example, because of a defect in the equipment, the highest temperatures also arise within the electrical connections. Therefore, in the event of an intolerable increase in current and in the heating of the electrical connections associated therewith, melting takes place selectively at these sites of reduced cross-section, which consequently act like a fuse.

Alternatively, the fuse can also be formed, for example, by a section of the electrical connections from a material, which has a lower meelting point or a higher specific resistance than do the remaining parts of the electrical connections.

In a preferred embodiment of the invention, the electrical connections of the probe are provided in the housing of the electronic module, and the fuse is disposed directly behind these connections, that is, between the connections and the probe, but still within the housing.

The housing of the electronic module preferably consists of aluminum.

In principle, the present invention can be used with all scanning devices, in which electrical current is supplied to a probe for scanning a scale graduation, irrespective of whether the scanning device works according to the inductive, the magnetic or the photoelectric principle.

BRIEF DESCRIPTION OF THE DRAWINGS

Further advantages of the invention will become clear with reference to the following description of the Figures, in which.

DETAILED DESCRIPTION OF THE DRAWINGS

Figure 1:
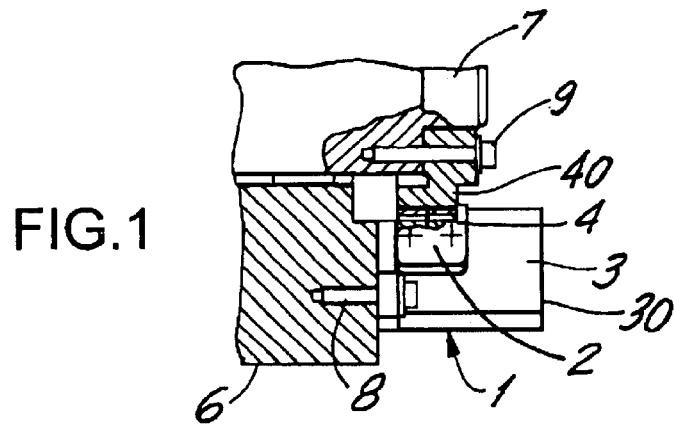
FIG. 1 shows a section of an angle measuring system, in accordance with the invention, comprising a scale graduation and a scanning device that are fastened to one of two mutually rotatable machine parts.

FIG. 1 shows a cross section through an angle measuring system comprising a scale graduation 4 mounted on a graduation drum 40 and a scanning device 1 for scanning the scale graduation 4. The scanning device 1 and the graduation drum 40 that is provided with the scale graduation 4, are assigned to two mutually rotatable machine parts 6, 7. The graduation drum 40 is fastened by a connection 9 to a drive shaft 7 and the scanning device 1 is fastened over a further bolted connection 8 to a seat 6 of the drive shaft 7.

In practice, the scanning, of the scale graduation 4, by the scanning device 1 to determine the angle of rotation of the shaft 7 relative to the seat 6 can be carried out according to different physical principles; especially, inductive, magnetic and photoelectric principles of measurement. Independent of the principle of measurement employed, the scanning of the scale graduation 4 takes place by a probe 2, of the scanning device 1, which contactlessly interacts with the scale graduation 4 over electrical, magnetic or optical signals. Based on such interactions, the probe 2 produces an electrical output signal that represents the extent of rotation of the shaft 7 relative to the stationary seat 6. The electric output signal is evaluated in an electronic module 3, of the scanning device 1, which is enclosed by a housing 30, comprising for example, aluminum, being produced in a direct casting method and being assigned to the probe 2.

Figure 2A:
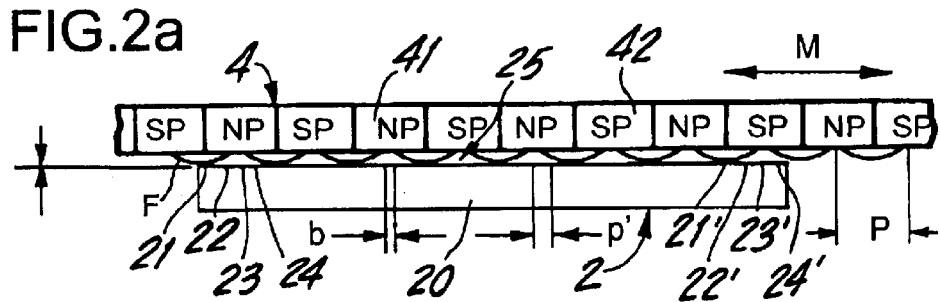
FIG. 2a shows a side view of the measuring system of FIG. 1.
Figure 2B:
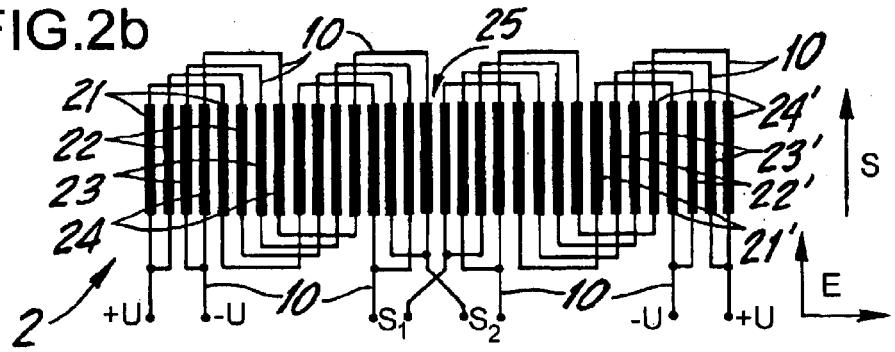
FIG. 2b shows a plan view of the probe of the measuring system of FIG. 2a, FIG. 2c shows the circuitry of the electrical components of the measuring system of FIG. 2a and FIG. 3 shows a portion of the scanning device of the angle measuring system of FIG. 1, which has fuses.
Figure 2C:
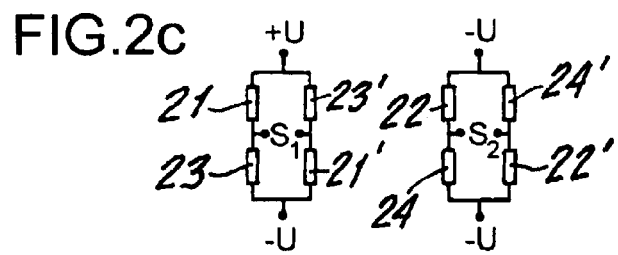

A magnetic principle of measurement for scanning the scale graduation 4 is shown by means of FIGS. 2a to 2c. It is a question here of a magnetoresistive measuring method, which is based on the effect that the electrical resistance of some alloys, especially of iron-nickel alloys, depends on the magnetic field strength.

This measurement principle is illustrated in FIGS. 2a to 2c by a lengthmeasuring system. This principle; however, can readily be transferred to the angle measuring system shown in FIG. 1. Instead of an extended measuring rule, it is necessary to provide the corresponding ring-shaped scale graduation on the graduation drum 40 of FIG. 1 and to construct and geometrically dispose the associated probe such that the probe is suitable for scanning a ring-shaped scale graduation.

According to the side view of FIG. 2a, a scale graduation 4 is formed by a permanent magnet measuring rule with a periodic sequence of magnetic north and south poles 41, 42 of the same extent, the extent of the individual north and south poles 41, 42 corresponding to the period P of the arrangement or the scanned signals. The magnetoresistive probe 2, intended for scanning this scale graduation 4, has a strip conductor microstructure 25, which is mounted on a support 20, such as a small glass plate, and which comprises a plurality of strips 21 to 24 and 21' to 24' of a magnetoresistive material. Alternatively, other magnetic field detectors, such as a Hall element, can also be used.

As can be seen from FIG. 2a and the plan view of the strip conductor microstructure 25 of FIG. 2b, the strip conductor microstructure 25 comprises a plurality of strip conductors 21 to 24 and 21' to 24', which are disposed next to one another and are in the form of strips of a magnetoresistive material, the width b of which (extent in the measuring direction M) is considerably greater than the thickness d, the thickness being, for example, 0.05 micrometers and the width b being 25 micrometers. These strip conductors 21 to 24 and 21' to 24' are divided into two groups, one (comprising the strip conductors 21 to 24) extends from a first, left edge of the small glass plate 20 to its center, while the other (comprising the strip conductors 21' to 24') extends from the other, right edge of the small glass plate 20 to the center of this plate.

Within one group, the strip conductors 21 to 24 and 21' to 24' are each connected together such that each fifth strip conductor is connected in series, wherein in each group of strip conductors 21 to 24 and 21' to 24' four connections in series are formed. Moreover, the strip conductors 21 to 24 and 21' to 24' are disposed periodically next to one another with a period p' being equal to one-quarter of the period P of the scanned signal. By such an arrangement, phase positions of the magnetic field strength of the scale graduation 4, which are offset by 90°, can be determined.

The individual strip conductors 21 to 24 and 21' to 24' are each connected together by copper conductors 10, which are not magnetically sensitive and are constructed as strip conductors. The copper conductors 10 are insulated from one another at their crossing points.

Optionally, it is possible to shield the whole surface of the probe 2 that is outside of the housing 30 by a coating or sheathing. The magnetic field strength must not be affected significantly by the coating or sheathing. Furthermore, the sheathing must be very thin, since the distance between the probe and the scale graduation is not to be increased. If the sheathing is carried out with an electrically conductive material, the probe must additionally be insulated from the electrical connections. On the basis of these stipulations, it is evident that sheathing the probe is an improved but by no means an adequate protection for use in a potentially explosive environment.

As can be seen from the equivalent circuits of FIG. 2c, the magnetoresistive conductor strips of the circuit arrangement shown in FIG. 2b are connected to form two Wheatstone bridges. At the inputs of each of the bridges there is a voltage of 2U and at the outputs there is a voltage $S_1$ or $S_2$.

Referring to FIGS. 2a to 2c, the function of the magnetoresistive scanning method will now be explained on the basis of the relative position of the probe 2 with respect to the scale graduation 4 shown in FIG. 2a.

In the position of the scale graduation 4 relative to the probe 2, shown in FIG. 2a, magnetic field lines F pass maximally in the measuring direction M (that is, perpendicular to the current direction S) through those strip conductors 21, 21', which are precisely between the north and south poles 41, 42 of the scale graduation 4. By this arrangement, the ohmic resistance of these strip conductors is reduced by a few percent.

On the other hand, when the field lines pass perpendicularly to the plane E of the strip conductor microstructure 25, in the direction of their least extent, through those strip conductors 23, 23', which are precisely opposite the north and south poles 41, 42, the ohmic resistance is not noticeably changed.

Corresponding considerations apply for the strip conductors 22, 22', 24, 24' of the strip conductor microstructure 25 which, in relation to the north and south poles 41, 42 of the scale graduation 4, are in those positions which, with respect to the positions of the strip conductors 21, 21', 23, 23' mentioned above, are each shifted by a quarter period P of the scale graduation 4.

In the case of a movement of the scale graduation 4 relative to the probe 2, sinusoidal voltages $S_1$ or $S_2$, the phase of which are shifted relative to one another each by a quarter period, arise at the outputs of the bridge circuits. The two signals are supplied to interpolation electronics within an electronic module (see electronic module 3 in FIG. 1), in which the measurement steps are determined by interpolation. For further details of this known method, reference is made to the "Digitale Längen- und Winkelmeβtechnik" (Digital Length and Angle Measuring Technique) of A. Ernst, $3^{rd}$ edition, 1998, especially to pages 14 ff and to pages 80 ff.

Figure 3:
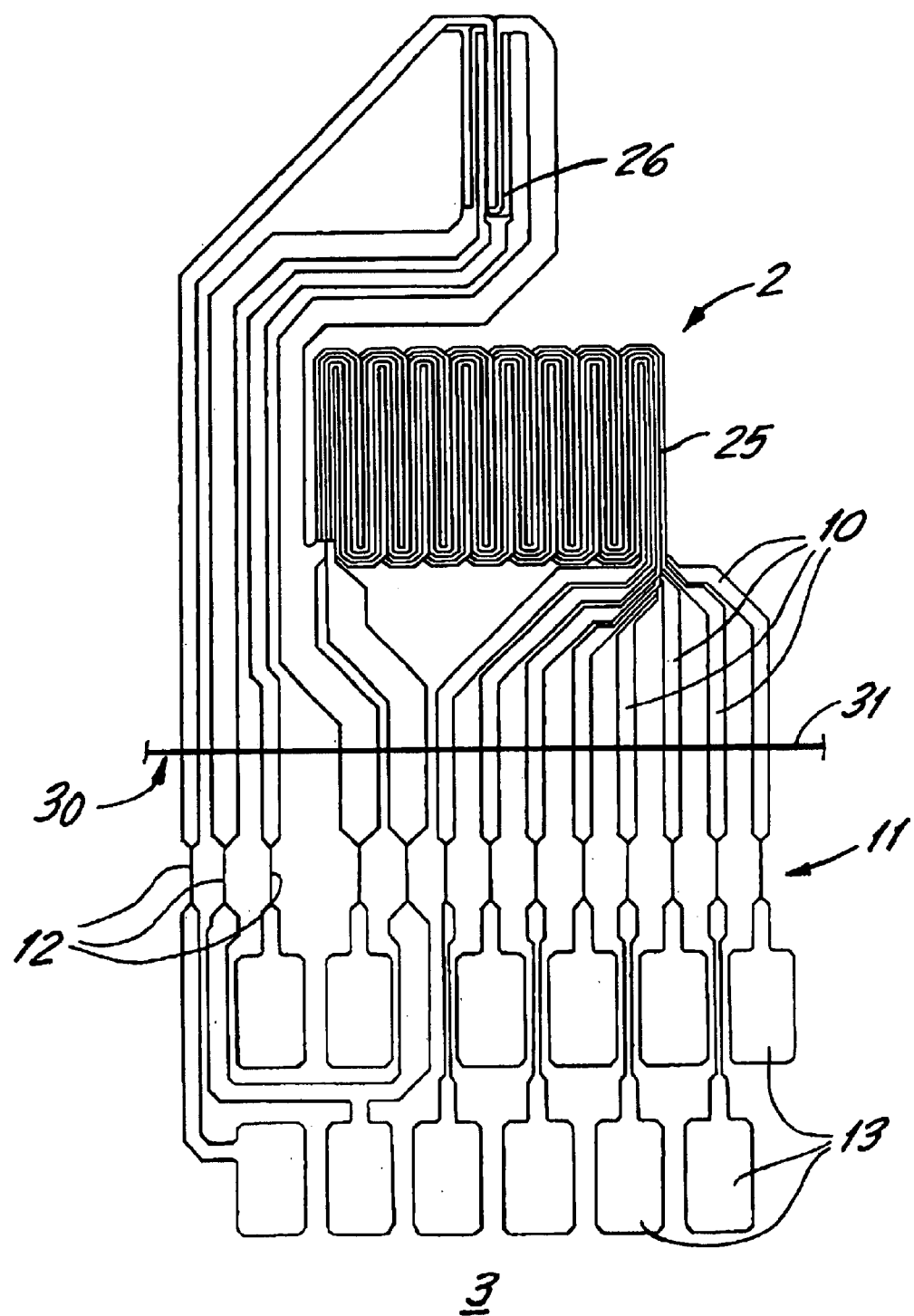

In FIG. 3, a magnetoresistive probe 2 is shown in the concrete configuration, in which it can be used in an angle measuring system of FIG. 1.

The probe 2 comprises a first conductor strip microstructure 26, which is used to detect a reference pulse, and a second conductor strip microstructure, 25 with a plurality of magnetoresistive conductor strips, which are intended to scan an incremental graduation. The magnetoresistive conductor strips are connected with one another over connecting leads 10 in the form of copper conductor strips, on the one hand, and, on the other hand, with electrical connections 13, which serve as inputs and outputs for the probe 2.

The electrical connections 13 are disposed within the housing 30 of an electronic module, of which only the surface 31 of the housing is shown in FIG. 3. At the same time, the housing serves as a thermal shield from the medium, surrounding the housing, and as a material shield. If, for example, the arrangement is. in an explosive gas mixture, then the housing must be gas-tight and thermally insulating.

Between the electrical connections 13 and the conductor strip microstructure 25 and within the housing 30, the copper conductors, forming the electrical connecting leads 10, each have a section 12, in which the cross section is constricted. These cross-sectional constrictions 12 form the fuses 11, since the current density or the ohmic resistance within the connecting leads 10 are highest in the region of the cross-sectional constrictions 12. As a result, when there is increased current flow, the cross-sectional constrictions 12 heat up more than the remaining sections of the connecting leads 10.

If the amperage increases greatly in the connecting leads 10 because of a defect in the device or for some other reason, the highest temperatures, produced by the amperage, are developed in the region of the cross-sectional constrictions 12. If this temperature exceeds the melting point of the material, the corresponding connecting lead 10 melts at the cross-sectional constriction 12 and the current flowing to the conductor strip microstructure 25 of the probe 2 is interrupted. By this arrangements, those parts of the scanning device, especially the conductor strip microstructure 25 of the probe 2, which are disposed outside of the housing 30 and therefore not shielded thermally from the surroundings, avoid being heated excessively by an unanticipated increase in current. In particular, arcing between the individual leads is avoided. This also makes it possible to use the probe 2 in potentially explosive surroundings.

Fuses in the form of cross-sectional constrictions 12 can be provided, in a few selective connecting leads 10, especially, in the voltage-supplying leads. Preferably, however, the cross-sectional constrictions 12 are provided in all connecting leads 10, which partially extend outside of the housing 30. This arrangement ensures that the connecting leads 10 do not heat up to an impermissibly high temperature even in a short circuit with an external power supply.

What is claimed as new and desired to be protected by letters patent is set forth in the appended claims:

What is claimed is:

1. A scanning device for a position measuring system for scanning a scale graduation comprising:

a probe being operatively connected with the scale graduation;

an electronic module being electrically coupled to the probe via conductor strips; the conductor strips supplying electric current to the probe;

a housing of the electronic module for shielding the electronic module from the surroundings, the probe being placed completely outside the housing, and at least parts of the conductor strips, leading from the electronic module to the probe, being disposed outside the housing; and means for limiting the supply of current to the probe, wherein at least one fuse is provided in the conductor strips, leading from the electronic module to the probe, within the housing, for interrupting the flow of current to the probe when the temperature produced as a result of the current flow exceeds a specific value, wherein the at least one fuse is formed by a sectional constriction of the conductor strips and wherein the housing of the electronic module further forms the housing of the at least one fuse.

2. The scanning device of claim 1, wherein a fuse is provided for each of the conductor strips extending partially outside of the housing.

3. The scanning device of claim 1, wherein the housing comprises aluminum.

4. The scanning device of claim 1, wherein the probe scans the scale graduation according to at least one of the inductive principle of measurement, the magnetic principle of measurement and the photoelectric principle of measurement.

5. The scanning device of claim 4, wherein the probe is a magnetoresistive probe.

* * * * *